United States Patent Office 3,264,240
Patented August 2, 1966

3,264,240
COKE FILLED POLYOLEFIN COMPOSITIONS
Marnell A. Segura, Atlantic Highlands, and Ora Lee Reedy, North Plainfield, N.J., assignors to Esso Research and Engineering Company, a corporation of Delaware
No Drawing. Filed Nov. 30, 1961, Ser. No. 156,118
1 Claim. (Cl. 260—28.5)

The present invention relates to filled poly alpha olefin compositions and is specifically concerned with the compounding of poly alpha olefins made from ethylene, propylene, the butylenes, and the copolymers formed from two or more of the corresponding monomers in which such olefinic polymer compositions are filled with petroleum coke.

Heretofore, numerous attempts have been made to fill the olefinic polymers with sand, carbon blacks, cokes, and with various pigments for the purpose of securing novel compositions having high loadings of fillers, which compositions would be useful and suitable for floor tiles, pipe, road surfaces, molded objects, building or structural panels, and blocks, and the like. Although many of these prior developments have succeeded in securing compositions of improved properties for the specific purposes in mind, as above mentioned, in many instances the compositions produced have been unsuitable for relatively high temperature conditions, or the tensile strengths have been inadequate, the flexural strengths have been too low, and/or the impact strengths have either been too low or, if high enough, the articles are themselves too brittle to withstand either final intended use or shipping and handling practices for the articles fabricated.

In order to produce the coke filled compositions having useful high temperature stability, relative freedom from brittleness and yet high tensile, flexural and impact strengths, it is necessary not only to correlate the particular type of polyolefin employed with the type of filler, but also the cost of the polyolefin and the cost of the filler must be low if the product is to find wide commercial usage even assuming that its physical properties met the requirements of the various trades. Additionally, the strength to weight ratio must be high so as to provide an ease of handling for shipping and transporting such fabricated materials to the ultimate users and consumers of the fabricated articles.

It has now been discovered that the aforementioned conventionally prepared polymeric alpha monoolefins, even to the extent of employing cheap grades and polymers that do not meet specifications, can be successfully utilized for the compounding of various articles for use under relatively high temperature conditions and wherein high impact, flexural, and tensile strengths are desired, through the expedient of compounding such polymers with relatively large amounts of petroleum coke whose particles are in a specified finely divided condition. It has been discovered, surprisingly, that the size distribution of the petroleum coke particles is critical for attaining high structural strengths in the finally compounded compositions. For example, not only is it practically impossible to incorporate more than 150 to 200 parts of petroleum coke particles whose sizes are coarser than 50 microns on an average, in diameter, into such polymers, but such products do not have the required high impact, tensile and flexural strengths required for the final uses to which such compositions are desirably put. Surprisingly, it has been discovered that when petroleum coke is comminuted and those particles, having a particle size distribution ranging between about 0.75 and about 50.0 microns, compounded with the polymers, highly desirable physical properties of the resultant compositions are obtained. Such compositions are then suitable for ultimate uses which have heretofore been considered beyond the ambit of uses for polyolefins of the type hereinbefore described.

Any polyolefin or copolyolefin of commerce having a melt index (ASTM 1238–57T) of between about 10 and about 0.2, and having a viscosity average molecular weight ranging from about 50,000 to about 700,000 may be employed in producing the novel compositions hereinafter described. Such polymers and copolymers may be prepared by the Ziegler process as set forth, for example, in the following patents and publications: Belgian Patents 533,362 and 537,782, "Chemical and Engineering News," April 8, 1957, pp. 12–16, and "Scientific American," September 1957, pp. 98 et seq. Any of the prior conventionally used processes for preparing alpha monoolefin polymers and copolymers may also be employed for preparing the polymeric components of the novel compositions. The present invention is not limited to any specific method of producing such polyolefins.

The petroleum cokes employed in producing the novel moldable compounds and compositions hereinafter described may be the delayed cokes, or the fluid cokes. In either case, the material can be employed, after suitable comminution, directly, for compounding with the polyolefins. However, if desired, such cokes may be subjected to a prior calcining operation, for example, at temperatures of 1200° F. to about 1400° F. for about 0.5 hour to about 10 minutes. Generally speaking, such precalcination of these cokes, before comminution, is unnecessary. A typical method by which fluid coke is produced is disclosed in Pfeiffer et al., U.S. Patent No. 2,881,130, issued April 7, 1959. The disclosure therein is incorporated into this disclosure by reference. Particular attention is called to that patent and to the characteristics of the coke particles produced by that process as disclosed in column 3, lines 13 through 28 and to the comminution method therein disclosed in the same column at lines 59–64. Material from this operation, which may have a particle size ranging between about 75 and about 500 microns in diameter, is necessarily subjected to a comminution operation before it may be used in the instant compounding operation. Such comminuted material is then sized to give a fraction having at least 60 weight percent (preferably at least 80 weight percent) of the particles coming within the range of between about 0.75 and about 50 microns, on an average, in diameter. Such a sized fraction will be, in most instances, one containing over 50% by weight of particles of about 1.0 micron to about 5.0 microns in diameter and has been found to be suitable for compounding to form the novel compositions herein described.

The fluid coke as it is produced in the fluid coking unit, may also have a particle size within the range of 30 to 200 mesh, a sulfur content of between about 1 and about 8 weight percent, and a volatile content of about 1 to 10 weight percent. The density will be between about 1.3 and about 1.7. As before mentioned, if low sulfur and hydrocarbon contents are desired, a calcination at temperatures of between 1600 and 2400° F. for between 1 and about 30 minutes is satisfactory.

As before stated, petroleum cokes whose average particle sizes are coarser than about 50 microns have been found to be unsuitable for use in producing the novel moldable compositions herein described because the physical strength properties of the compositions are not those found suitable for molded articles. The comminution and sizing of the petroleum cokes preparatory to their use in preparing the novel compositions herein described may be carried out in various well-known ways. For example, the comminution may be achieved through ball milling, rod milling, hammer milling, impingement of the coke particles against a surface or target by blowing with steam or air, by centrifugal impingement action of rotor blades (Pallman Pulverizer), by supersonic vibration, or through the use of opposed steel rolls which have a clearance of 0.01" or less. The particular method employed for comminuting the petroleum coke particles is not critical, but, from a practical standpoint, ball milling and centrifugal impingement have been found to produce, most readily, the greatest yield of particles having from 0.75 to 50.0 microns in diameter. Generally, these methods will produce within this designated critical size fraction range more than 50 weight percent of the particles within the range of from 1 to 5 microns, and in most instances by comminuting in a ball mill, for example, for about two hours, a fluidized petroleum coke has been comminuted to yield fractions in which about 85 weight percent of less than 50 micron material was in the 1 to 5 micron range. This is a particularly suitable size distribution for use in the compounding of the novel polymer-coke-filled compositions herein described.

While useful products are produced through the use of comminuted coke particles with the polyolefin in a ratio of as low as 50 parts by weight of coke per 100 parts by weight of polymer (php.), the greatest advantages in physical properties in the coke filled compositions are not achieved short of using at least equal parts of coke and polymer. The most satisfactory products, however, and the preferred compositions, involve the use of coke filler ranging between about 100 and about 500 parts of coke php. with the preferred practically operating ranges being between about 200 and about 400 parts of coke php. Heretofore such large amounts of coke filler per unit of weight of polymer have been unattainable. It is a discovery upon which the instant invention is based that the critical size range of the coke particles and the particular shape of the coke particles, i.e., sharp edges and corners, unexpectedly permits the introduction and compounding of such large quantities of coke filler into the polyolefins. The use of coarser particles than those herein specified enables one, at the most, to incorporate, for example, about 150 parts of coke filler into 100 parts of polyethylene.

The incorporation of the coke filler into the polyolefin may be accomplished in any number of conventional ways such as, for example, through the use of Banbury mixers (Morton, Introduction to Rubber Technology, pages 521–527, Reinhold Publishing Company, 1959), through the use of conventional milling machines for the incorporation of solid materials into plastic materials, and through such other types of conventional equipment (opposed rollers) as is customarily employed in the rubber and plastic industries in the compounding of elastomers with solid particles. In general, regardless of the type of mixer, in using steel rolls, heat should be applied both to the polyolefin plastic and to the coke filler particles, as well as to the rolls and blades of the mixer, or other device for compounding, so that less energy is required for masticating the polymer with the coke filler. Temperatures of 350 to 600° F., using compounding times of from 2 minutes to 1 hour will be satisfactory in most instances, to effect a complete compounding into a homogeneous mixture.

The following examples illustrate the nature and character of the coke-filled polyolefin in compositions and the methods by which such compositions are made. It is, however, not intended that the present invention be limited to the precise compositions and procedures disclosed but that these examples are to serve merely as illustrations of the character and general nature of the invention.

EXAMPLE I

A sample of fluidized petroleum coke was ball-milled for about one hour and separated into three sized fractions on a standard Tyler screen as follows:

A _____ —325 mash.
B _____ —200 mesh to +325 mesh.
C _____ —150 to +200 mesh.

200 parts by weight (and hereinafter all parts are by weight) of each of these fractions were separately compounded on a size B Banbury mixer with three aliquots each consisting of 100 parts of polypropylene having a molecular weight of about 170,000. Additionally, as shown in the table below, a blend of the three sized fractions was also compounded with a polypropylene of about 350,000 molecular weight. Finally, one additional test was carried out using only the —325 mesh material but using polypropylene having an average molecular weight of about 350,000 as determined by the Kinsinger method (1958 doctoral thesis of Jack B. Kinsinger, University of Pennsylvania). All the mixtures of coke and polypropylene were masticated in the Banbury mixer for about 10 minutes at a temperature of about 360–400° F. The following results were obtained:

Table I

| Coke Particle Size | Tensile, p.s.i. | | Impact-Izod Unnotched | | |
|---|---|---|---|---|---|
| | Blend | Control Polymer | 73° F. | 0° F. | —40° F. |
| —325 mesh_____ | 3,320 | 2,990 | 2.6 | 2.1 | 2.0 |
| —200 to +325 mesh____ | 2,370 | 2,990 | 1.3 | 1.3 | 1.3 |
| —150 to +200 mesh____ | 1,660 | 2,990 | 1.2 | 1.1 | 1.1 |
| 50% —325 mesh_____ | | | | | |
| 30% —200 to +325____ | 4,470 | 4,560 | 2.1 | 1.7 | 1.7 |
| 20% —150 to +200____ | | | | | |
| —325 mesh_____ | 5,440 | 4,560 | 3.1 | 2.1 | 2.5 |

Tensile strengths were measured by the standard test procedure designated ASTM D–638–58T and the impact strength by the Izod standard test procedure designated ASTM D–256–54T.

It is at once apparent from a study of the data appearing in Table I that the particle size of the coke filler particles gives unexpectedly high tensile and impact strengths when the coke particles are of a size less than 44 microns (—325 mesh) as compared with the unfilled polypropylene polymers. A further microscopic inspection of the —325 mesh coke particles indicated that about 85% of these particles were of the order of from 1 to 5 microns in diameter.

EXAMPLE II

A further run was carried out using 200 parts of petroleum coke (php.) of about 90% —44 micron (—325 mesh) with two different Kinsinger molecular weight polypropylenes. The data in Table II were obtained.

These data show that as the molecular weight of the

Table II

| Polypropylene, Molecular Weight | Melt Index | Strength at Yield | | Impact Strength, Izod Rm. Temperature | |
|---|---|---|---|---|---|
| | | Rm. Temp. (.05"/min.) | 120° F. (.2"/min.) | (Unnotched) | (Notched) |
| (a) 250,000_____ | 5.7 | 4,510 | 3,720 | 2.56 | 0.44 |
| (b) 445,000_____ | 1.2 | 4,790 | 4,140 | 3.26 | 0.56 | polypropylene used is increased, the physical strengths of the coke-filled polymers (using the same weight ratios of coke to polymer) increase.

EXAMPLE III

The same fraction of petroleum coke as was used in Examples I and II, was used with the polypropylene of about 250,000 Kinsinger molecular weight employed in Example II, but still further amounts and different ratios by weight of coke to polymer were employed in accordance with the data shown in Table III. All pads were pressed by compression molding at about 350 to 400° F. and they were cut into sample bars and tested in accordance with the procedures previously outlined.

*Table III*

| Coke php. | Tensile Strength, p.s.i. 0.2″ min. at 120° F. | Impact Izod (Unnotched) |
|---|---|---|
| (a) 0 | 2,990 | 4.0-5.0 |
| (b) 100 | 3,610 | 4.30 |
| (c) 200 | 3,720 | 2.56 |
| (d) 400 | 3,910 | 1.01 |

The data in Table III illustrates the difference in tensile and impact strengths, depending upon the variation in the amount of coke filler employed per 100 parts of polypropylene.

The coke-filled polypropylene in Example III(c) was processed into 1½″ extruded pipe. The original polypropylene pellets and coke in the amount of 200 php. as in Example III(c) were compounded in a twin screw 2″ extruder while maintaining a temperature of 190–215° C. and were then repelletized. This pelleted material was then fed to a 2″ single screw extruder fitted with a 1½″ pipe die and was extruded through this die while maintaining a temperature in the screw and die of about 390–410° F. and under a die pressure between 2,000 and 3,000 p.s.i. The pipe was smooth both on its interior and exterior surfaces and had a quick bursting strength at 74° F. of about 840 lbs. per sq. inch.

EXAMPLE IV

In still another run, polyethylene of about 170,000 mol. wt. was compounded with the same comminuted petroleum coke fraction as was used in the preceding examples, i.e. about 90% of −44 micron average particle size in the amount shown in Table IV. Pressed pads, i.e. molded pads, were cut into sample bars and were tested with the results shown in the following table.

*Table IV*

| Coke php. | Tensile (room temp.) | Impact Izod, Room Temp. | |
|---|---|---|---|
| | | Notched | Unnotched |
| (a) 0 | 3,550 | 15.3 | 128.0 |
| (b) 89 | 4,360 | 0.7 | 3.7 |
| (c) 194 | 5,050 | 0.75 | 4.0 |

In both Examples III and IV tensile strength at yield was found to have increased as the coke loading had been increased. In other words, in the case of both polyethylene and polypropylene increasing the amount of coke filler compounded into the polyolefin results in increased tensile strengths.

The compounded material of Example IV(c) was extruded into pipe, which was light-weight, and found to be particularly well suited as a down pipe for oil wells where the principal stress is due to the weight of the pipe. It was found to be thermally weldable resulting in a joint as strong as the pipe itself and it was also found to be particularly useful in high temperature service where ordinary polyethylene without coke filler is not suitable. A 2″ internal diameter extruded pipe made from the composition of Example IV(c) had the following burst pressures and these pressures are compared to an ordinary polyethylene pipe containing no comminuted petroleum coke filler.

| Coke Filled Polyethylene | Burst pressure, p.s.i. Temperature, ° F. | Polyethylene |
|---|---|---|
| 750 | 75 | 530 |
| 390 | 170 | 210 |

EXAMPLE V

A copolymer was prepared by the Ziegler process by polymerizing 99.34 mol percent of ethylene with 0.66 mole percent of butylene-1 to produce a copolymer having a molecular weight of about 270,000. About 175 parts by weight of comminuted petroleum coke of 1 to 44 microns average particle size was compounded with 100 parts by weight of the copolymer in a Banbury mixer for about 30 minutes and pressure test pads of compounded material were made up at about 400° F. and compared with the copolymer having no coke filler added to it. The following strengths were obtained:

*Table V*

| Coke/php. | Tensile Strength, p.s.i. | | Flexural Strength, p.s.i. | |
|---|---|---|---|---|
| | 75° F. | 175° F. | 75° F. | 175° F. |
| (a) 0 | 2,730 | 1,190 | 3,150 | 1,580 |
| (b) 175 | 4,260 | 2,190 | 7,260 | 4,610 |

In place of a copolymer having the above-identified molecular weight, other copolymers of ethylene with other $C_4$ monoolefins or with propylene may also be produced and utilized in the instant novel process. The copolymers may range in molecular weight between about 100,000 and about 700,000, but it is necessary that the comminuted petroleum coke have an average particle size of between about 0.75 and about 50 microns in order to achieve the improved results heretofore specified.

The extruded pipe produced from the composition of Example V(b) is likewise light weight and is particularly well suited for service under temperature conditions ranging from 175 up to 225° F. Ordinary polyethylene pipe is usually limited to service under temperatures no higher than about 150° F.

Having thus fully described and illustrated the novel compositions and their method of preparation and uses what is desired to be secured by Letters Patent is:

A moldable composition of matter consisting essentially of polypropylene admixed with about 200 to 400 parts by weight, per 100 parts by weight of said polypropylene, of comminuted petroleum coke having a volatile content of no more than about 10 wt. percent, at least 60 wt. percent of said coke having a particle size distribution between about 0.75 and about 50 microns and wherein the remainder of said coke above said 50 micron size has particle size sufficiently small to permit complete incorporation into said polypropylene.

References Cited by the Examiner

UNITED STATES PATENTS

| | | | |
|---|---|---|---|
| 2,475,699 | 7/1949 | Derksen. | |
| 2,832,759 | 4/1958 | Nowlin et al. | 260—88.2 |
| 2,868,749 | 1/1959 | Hugg. | |
| 2,876,496 | 3/1959 | Murphy. | |
| 2,881,130 | 4/1959 | Pfeiffer et al. | 208—127 |
| 2,975,159 | 3/1961 | Weinmayr | 260—41 |
| 2,991,268 | 7/1961 | Langan | 260—41 |
| 3,010,794 | 11/1961 | Friauf et al. | 23—209.4 |
| 3,095,608 | 7/1963 | Munsell. | |
| 3,105,057 | 9/1963 | Medalia | 260—41 |

(Other references on following page)

FOREIGN PATENTS 850,473  10/1960  Great Britain.

OTHER REFERENCES

Miall: A New Dictionary of Chemistry, Interscience Publisher Inc., New York, 1961.

Mantell: Industrial Carbon, D. Van Nostrand Co., Inc., New York, chapter IV, p. 67, 1946.

MORRIS LIEBMAN, *Primary Examiner.*

MILTON STERMAN, *Examiner.*

J. ZEIGLER, D. C. KOLASCH, B. A. AMERNICK,
*Assistant Examiners.*